A. E. FALOR AND F. J. MacDONALD.
BEVELING DEVICE FOR RUBBER TUBES.
APPLICATION FILED AUG. 27, 1920.
1,363,462.
Patented Dec. 28, 1920.
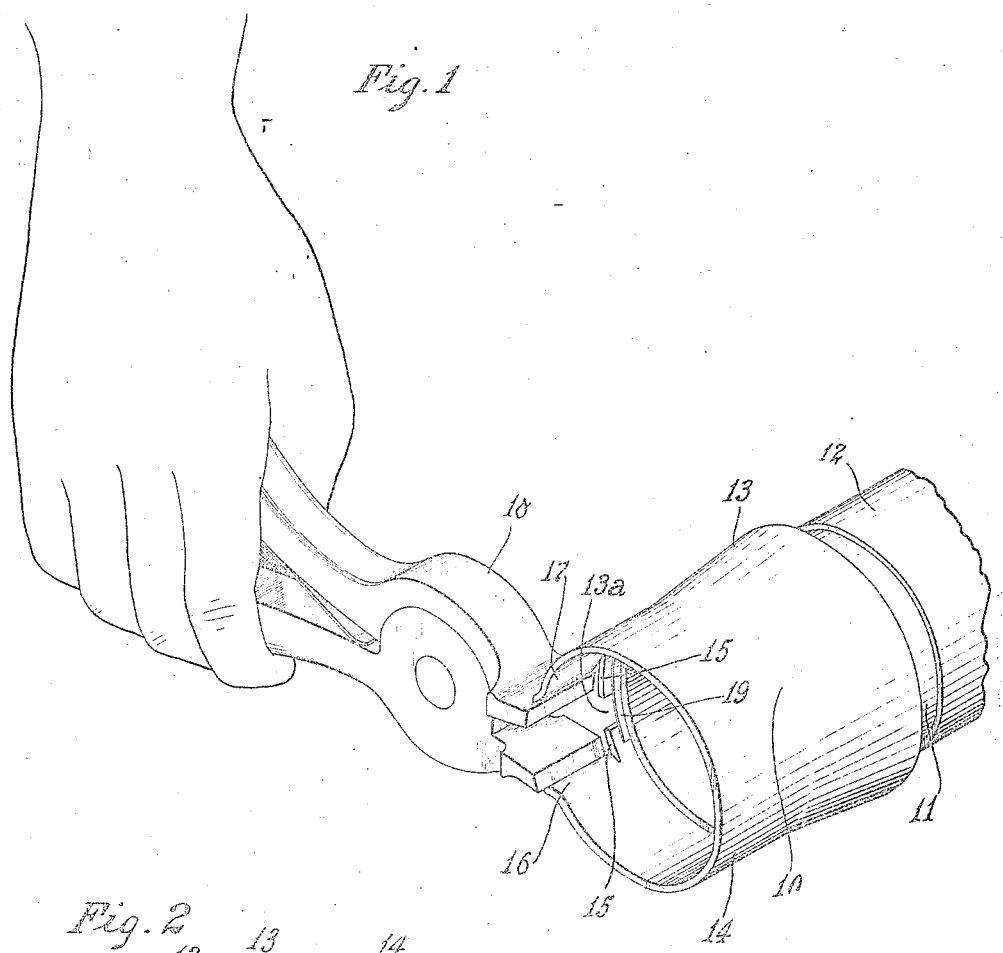
Fig. 1
Fig. 2
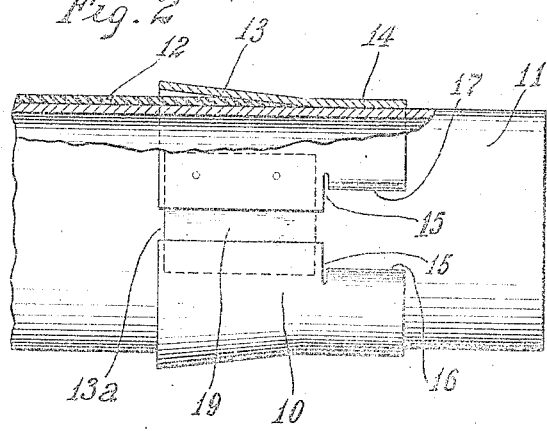
Inventors
A. E. Falor
F. J. MacDonald
By Robert M. Pierson
Atty.

UNITED STATES PATENT OFFICE.

ABRAM E. FALOR AND FRANK J. MacDONALD, OF AKRON, OHIO, ASSIGNORS TO THE B. F. GOODRICH COMPANY, OF NEW YORK, N. Y., A CORPORATION OF NEW YORK.

BEVELING DEVICE FOR RUBBER TUBES.

1,363,462.      Specification of Letters Patent.      Patented Dec. 28, 1920.

Application filed August 27, 1920. Serial No. 406,472.

*To all whom it may concern:*

Be it known that we, ABRAM E. FALOR and FRANK J. MACDONALD, citizens of the United States, residing at Akron, in the county of Summit and State of Ohio, have invented a certain new and useful Beveling Device for Rubber Tubes, of which the following is a specification.

This invention relates to means for producing a taper or bevel at the end of a rubber tube during vulcanization as, for example, in the manufacture of inner tubes for automobile tires. In this instance, a straight tube, having been formed of uncured rubber, is placed upon a cylindrical mandrel and vulcanized thereon, then removed therefrom and its two ends joined together to form the annular inner tube. It is desirable that the walls of the tube be tapered toward the ends in order to make a telescoped beveled seam.

Heretofore it has been the practice to bind the ends of the tube, while on the mandrel and before vulcanization, with binding tape, so that when the rubber is subjected to the vulcanizing heat and becomes plastic it will permanently yield to the compression of the binding tape and assume a tapered form in the vulcanized product. The use of binding tape is slow, and since the tape must be scrapped after each vulcanization, it is expensive.

The object of our invention is to provide quick, efficient and economical means for the purpose above described, and to produce a more regular tapered form than has heretofore been obtained.

Of the accompanying drawings:

Figure 1 is a perspective view of a preferred form of our beveling device, showing the manner of using the same.

Fig. 2 is a side view of the same, partly in section.

Referring to the drawings, 10 is the beveling sleeve, 11 is a mandrel and 12 is an uncured rubber tube thereon. The sleeve 10 is resilient and formed of sheet metal, having a flared or frusto-conical portion 13 at one end and a cylindrical portion 14 at the other end to bear on the mandrel. It is cut through longitudinally on one side, as shown at 13ᵃ. On each side of the longitudinal cut is a relatively short transverse cut 15, approximately at right angles thereto, in the cylindrical region of the device, forming lips 16 and 17, which are turned outward as shown, to be engaged by an expanding tool such as the pliers 18. A thin metal plate 19 adapted to serve as a bridge for the side opening when the sleeve is expanded is secured to the inner wall of the frusto-conical portion on one side of the cut 13ᵃ.

In operation, the uncured rubber tube is placed upon the mandrel, the beveling sleeve is expanded, as shown, and while expanded is slipped over the end of the mandrel as indicated in Fig. 1 and is then allowed to contract onto the end of the rubber tube, approximately to the position shown in Fig. 2, before vulcanization of the tube. During vulcanization, the flared portion of the sleeve compresses the end of the tube against the mandrel and causes it to assume permanently the desired tapered or beveled form, the bridge 19 preventing the escape of rubber through the cut 13ᵃ.

The device may be quickly applied and removed, produces a smooth and even taper of the rubber surface and may be used over and over again.

We claim:

1. In combination with a cylindrical mandrel, a removable flexible sleeve formed with a longitudinally divided frusto-conical portion adapted yieldingly to embrace the end of a rubber tube upon said mandrel.

2. In combination with a cylindrical mandrel, a flexible sleeve formed with a frusto-conical portion split longitudinally, and with means on each side of the split adapted for engagement by an expanding means.

3. In combination with a cylindrical mandrel, a beveling device comprising a flexible collar formed with a frusto-conical portion split longitudinally, and a bridge extending across the split.

4. A beveling device for rubber tubes comprising a flexible sleeve formed with a frusto-conical portion split longitudinally, lips on each side of the split adapted for engagement by an expanding tool, and a bridge extending across said split and attached to said frusto-conical portion on one side of the split.

In testimony whereof we have hereunto set our hands this eleventh day of August 1920.

ABRAM E. FALOR.
FRANK J. MacDONALD.